(12) United States Patent
Swanson et al.

(10) Patent No.: US 7,871,242 B2
(45) Date of Patent: Jan. 18, 2011

(54) SINGLE ACTUATOR CONTROLLED ROTATIONAL FLOW BALANCE SYSTEM

(75) Inventors: Timothy A. Swanson, Coventry, CT (US); Carl T. Elving, Southlake, TX (US); Robert T. Brooks, Killingworth, CT (US)

(73) Assignee: United Technologies Corporation, Hartford, CT (US)

( * ) Notice: Subject to any disclaimer, the term of this patent is extended or adjusted under 35 U.S.C. 154(b) by 1065 days.

(21) Appl. No.: 11/755,925

(22) Filed: May 31, 2007

(65) Prior Publication Data

US 2009/0097965 A1 Apr. 16, 2009

(51) Int. Cl.
*F01D 9/00* (2006.01)

(52) U.S. Cl. .................. 415/145; 415/155; 415/160; 415/1

(58) Field of Classification Search .......... 415/1, 415/155, 159, 161, 145, 160; 60/226.1, 226.3
See application file for complete search history.

(56) References Cited

U.S. PATENT DOCUMENTS

| | | | |
|---|---|---|---|
| 4,086,761 A | * | 5/1978 | Schaut et al. ............. 60/226.1 |
| 4,275,560 A | * | 6/1981 | Wright et al. ............. 60/226.3 |
| 4,409,788 A | * | 10/1983 | Nash et al. ............... 60/226.3 |
| 5,694,767 A | * | 12/1997 | Vdoviak et al. ........... 60/226.3 |
| 6,662,546 B1 | | 12/2003 | Giffin, III |
| 6,694,723 B2 | | 2/2004 | Ward |
| 6,745,571 B2 | | 6/2004 | Stuttaford et al. |
| 6,899,518 B2 | | 5/2005 | Lucas et al. |
| 6,942,181 B2 | | 9/2005 | Dionne |
| 6,969,232 B2 | | 11/2005 | Zess et al. |
| 7,011,494 B2 | | 3/2006 | Kies et al. |
| 7,028,484 B2 | | 4/2006 | Prociw et al. |
| 7,055,303 B2 | | 6/2006 | Macfarlane et al. |
| 7,063,503 B2 | | 6/2006 | Meisels |
| 7,097,421 B2 | | 8/2006 | Swanson et al. |
| 7,101,146 B2 | | 9/2006 | Coull et al. |
| 7,114,519 B2 | | 10/2006 | Aitchison et al. |
| 7,137,255 B2 | | 11/2006 | Schmotolocha et al. |
| 7,192,245 B2 | | 3/2007 | Djeridane et al. |

* cited by examiner

*Primary Examiner*—Ninh H Nguyen
(74) *Attorney, Agent, or Firm*—Carlson Gaskey & Olds PC (57) ABSTRACT

A rotational flow balance system includes an actuator system which controls operation of both a fan duct blocker ring and a modulated exhaust cooling ring through a kinematic system. The kinematic system is controlled by the single actuator system such that the modulated exhaust cooling ring will remain in a fixed position while the fan duct blocker ring can be moved to satisfy operational requirements.

14 Claims, 7 Drawing Sheets

FIG. 5A 0" Stroke–MEC Moving

FIG. 5B 0.5" Stroke–MEC Moving

FIG. 5E 2" Stroke–MEC Not Moving and Locked

FIG. 5D 1.5" Stroke–MEC Not Moving

FIG. 5C 1" Stroke–MEC Stationary

SINGLE ACTUATOR CONTROLLED ROTATIONAL FLOW BALANCE SYSTEM

This invention was made with government support under Contract No.: N00019-02-C-3003 awarded by the Department of the Navy. The government therefore has certain rights in this invention.

BACKGROUND OF THE INVENTION

The present invention relates to a gas turbine engine, and more particularly to a rotational flow balance system controlled by a single actuator system to satisfy operational requirements of the gas turbine engine while providing inherent benefits of semi-coupling together two or more flow control components.

In current gas turbine engine exhaust ducts, a liner is disposed between the engine exhaust gas path and the engine outer casing or duct. Cooling air is flowed between the cooling liner and duct then discharged over the seals and flaps of the nozzle located at the rear end of the exhaust duct. In order to improve engine operation and performance, exhaust duct cooling air is carefully rationed. Since cooling air extracted from the engine may then not be utilized for producing thrust, this extracted cooling air may be a penalty to the overall performance of the engine.

To control the quantity of cooling airflow while the engine is subjected to large core pressure gradients at various operating conditions, a rotational flow balance system includes a rotatable control member that is rotated to control the cooling airflow. A multiple of rotational flow balance systems facilitate control of the quantity of cooling airflow during multi-cycle operation of the gas turbine engine. Although effective, each rotational flow balance system typically includes a separate actuation system which generally increases engine weight and complexity.

Accordingly, it is desirable to provide a rotational flow balance system with a multiple of rotational components which are controlled by a single actuator system.

SUMMARY OF THE INVENTION

The rotational flow balance system according to the present invention includes an actuator system which controls operation of both a fan duct blocker ring and a modulated exhaust cooling (MEC) ring through a kinematic system. The kinematic system generally includes a drive crank, a MEC crank, a MEC drive linkage, a fan duct blocker drive linkage and an input crank. The MEC crank has a slot that receives a crank pin of the input crank. Motion of the input crank selectively engages and disengages the crank pin with the MEC crank slot to rotate the MEC crank. As the crank pin is moved out of the MEC crank slot, the MEC drive linkage drives the MEC ring toward a closed position. Conversely, as the crank pin is moved into the MEC crank slot, the MEC crank is cammed such that the MEC drive linkage drives the MEC ring toward the open position. The relationship between the input crank and the fan duct blocker drive linkage is such that the common joint between them is initially in the over center position. Initial motion of the input crank drives the fan duct blocker drive linkage on center. Further motion of the input crank drives the fan duct blocker drive linkage under center. During this initial movement the fan duct blocker ring moves a very small amount due to dwelling of the input crank and the fan duct blocker drive linkage about the on center position.

The present invention therefore provides a rotational flow balance system with a multiple of rotational components which are controlled by a single actuator system such that one rotational component can remain in position while other rotational components move to satisfy operational requirements.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
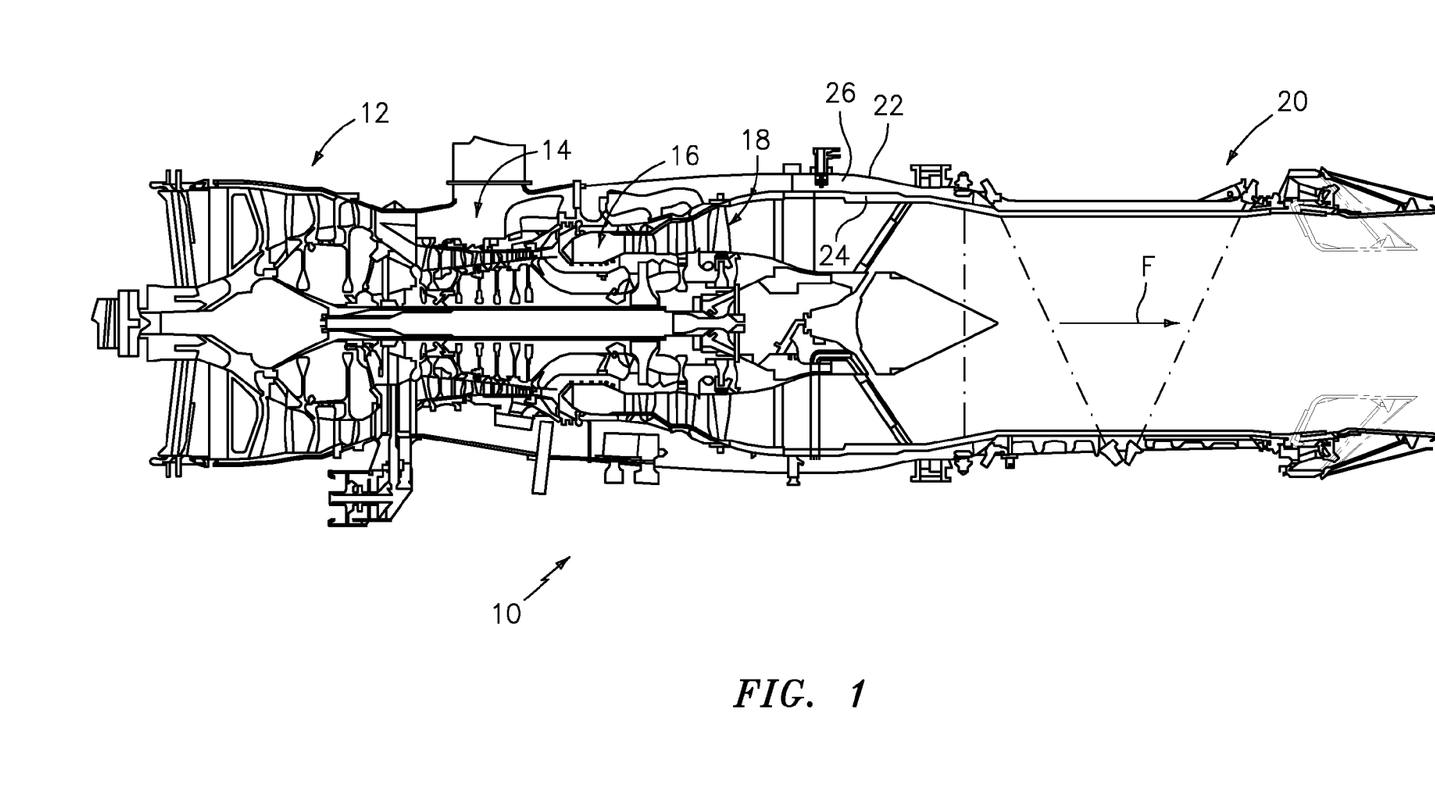
FIG. 1 is a general perspective view an exemplary gas turbine engine embodiment for use with the present invention.

FIG. 1 schematically illustrates a gas turbine engine 10 which generally includes a fan section 12, a compressor section 14, a combustor section 16, a turbine section 18, and a nozzle section 20. Within and aft of the combustor 16, engine components are typically cooled due to intense temperatures of the combustion core gases.

An outer engine case 22 and an inner cooling liner structure 24 define an annular secondary fan bypass flow path 26. It should be understood that various structures within the engine may be defined as the outer engine case 22 and the inner cooling liner structure 24 to define various cooling airflow paths such as the disclosed fan bypass flow path 26. The fan bypass flow path 26 guides a cooling airflow (illustrated schematically by arrows C, FIG. 2) between the outer engine case 22 and the inner cooling liner structure 24. Cooling airflow C and/or other airflow that is different from the exhaust gas flow (illustrated schematically by arrow F) is typically sourced from the fan section 12 and/or compressor section 14. The cooling airflow C is utilized for a multiple of purposes including, for example, pressurization and partial shielding of the nozzle section 20 from the intense heat of the exhaust gas flow F during particular operational profiles.

Figure 2:
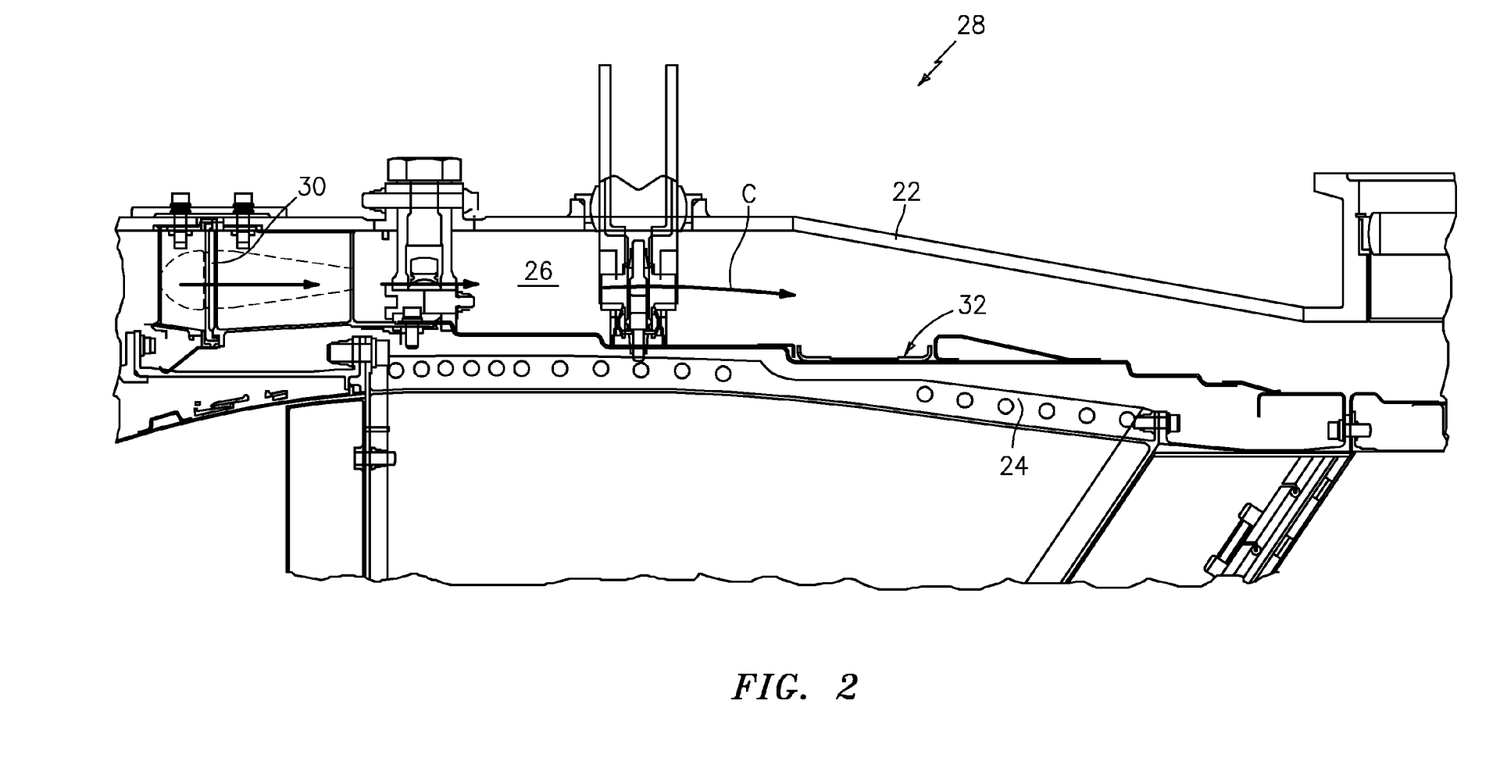
FIG. 2 is an expanded view of a rotational flow balance system within a fan bypass section of the gas turbine engine.

Referring to FIG. 2, a rotational flow balance system 28 generally includes a fan duct blocker ring 30 and a modulated exhaust cooling (MEC) ring 32. The fan duct blocker ring 30 and the modulated exhaust cooling ring 32 are rotated between a blocking position and an open position dependent on whether cooling airflow is required. Under certain conditions, such as when an aircraft is hovering, less cooling airflow is required in the nozzle section 20 and by blocking the cooling airflow thereto, additional cooling airflow becomes available for other purposes.

Figure 3:
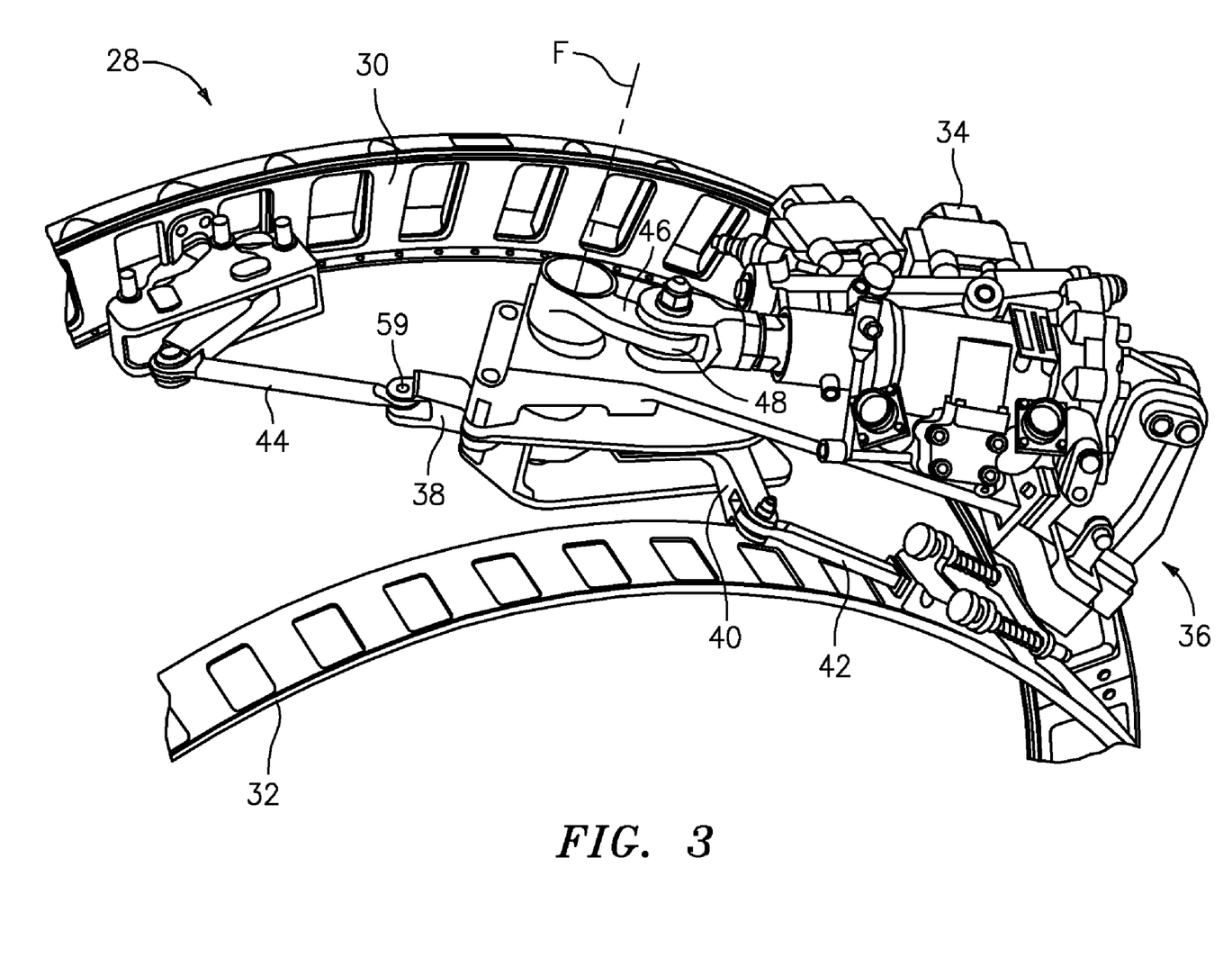
FIG. 3 is a general arrangement view of a rotational flow balance system.
Figure 4:
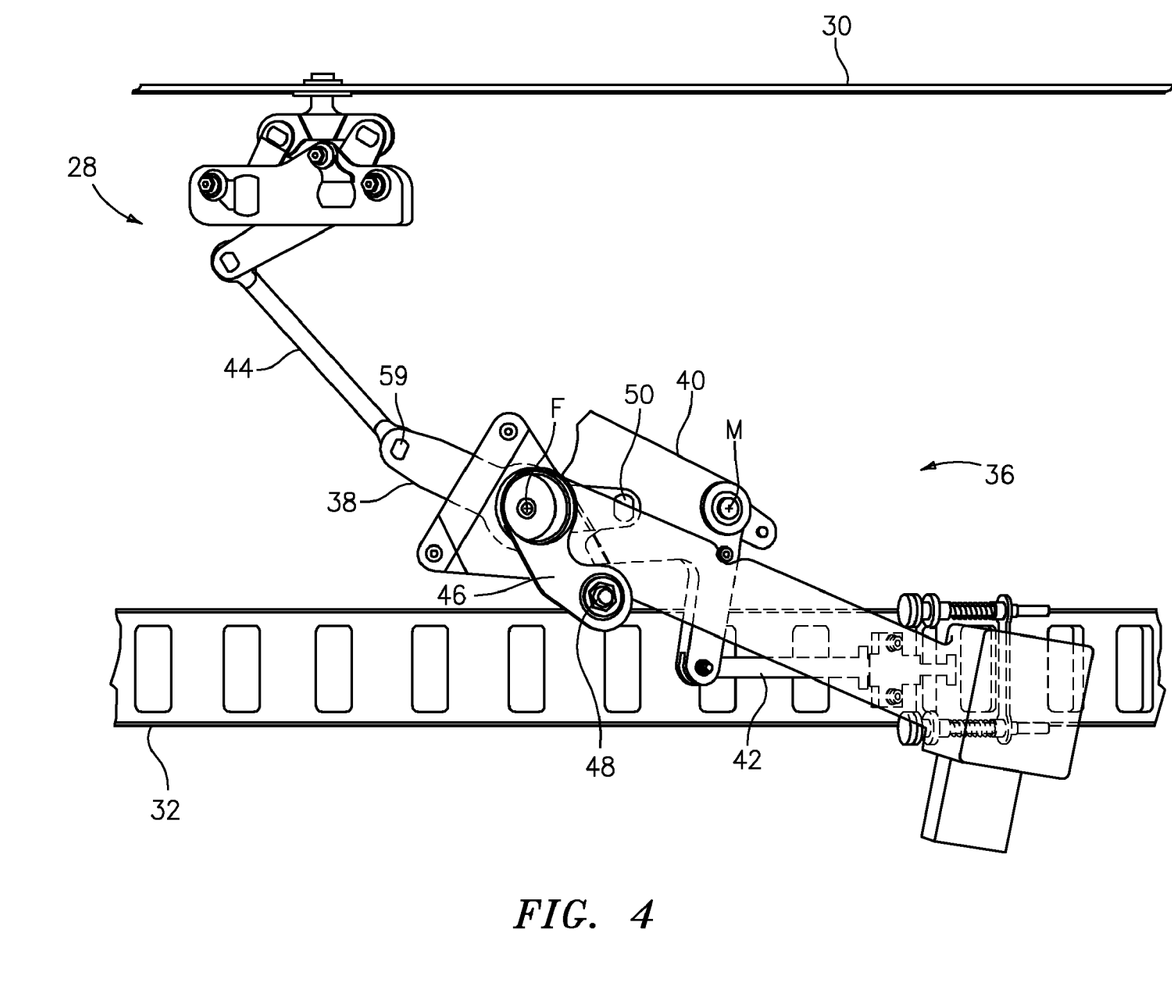
FIG. 4 is a plan view of a rotational flow balance system in a generally open position.
Figure 5A:
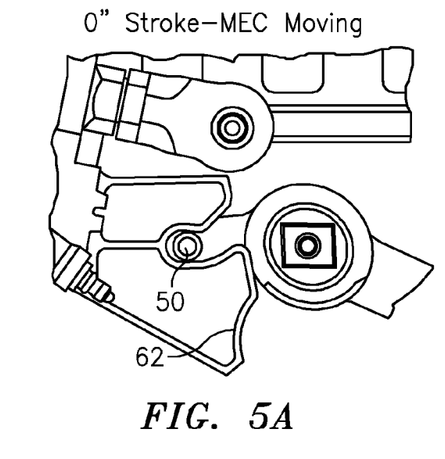
FIGS. 5A-5E are plan views of a rotational flow balance system in five positions.
Figure 5B:
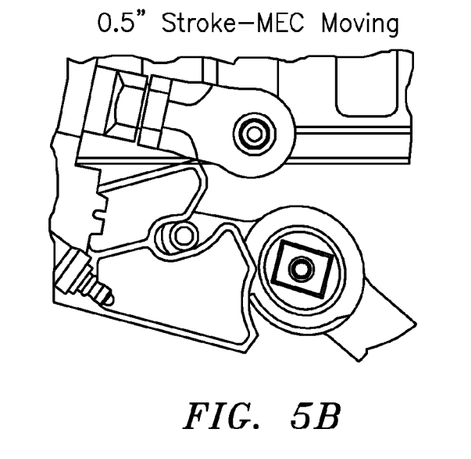
Figure 5C:
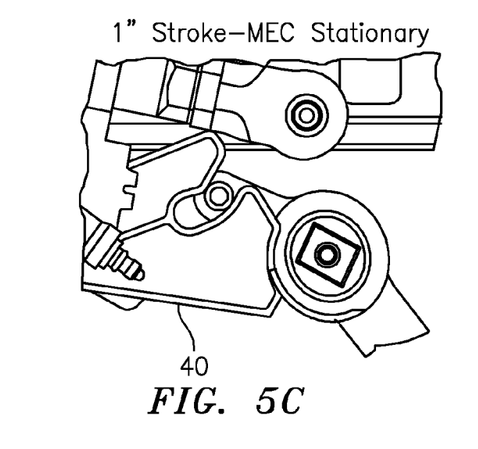
Figure 5D:
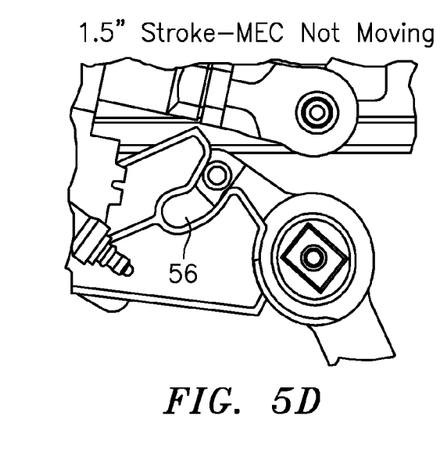
Figure 5E:
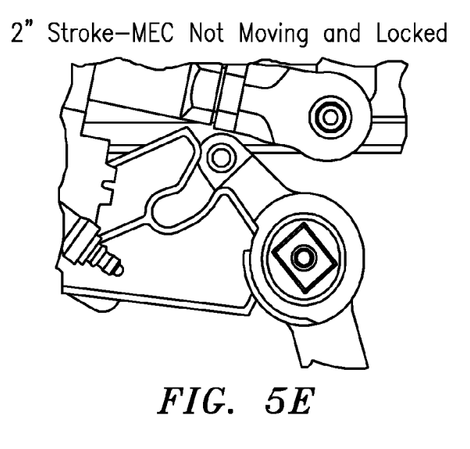

Referring to FIGS. 3 and 4, the rotational flow balance system 28 includes an actuator system 34 having as a hydraulic, pneumatic or electromagnetic actuator which controls operation of both the fan duct blocker ring 30 and the MEC ring 32 through a kinematic system 36. The kinematic system 36 is driven by the actuator system 34 such that the MEC ring 32 can stop at a specified position and lock into position while the fan duct blocker ring 30 remains moveable to satisfy operational requirements.

The kinematic system 36 generally includes an input crank 46, a drive crank 38, a MEC crank 40, a MEC drive linkage 42, and a fan duct blocker drive linkage 44. The actuator system 34 is linked to the input crank 46 in the disclosed embodiment, at a clevis joint 48 to rotate the drive crank 38 about a drive crank axis F.

Figure 6A:
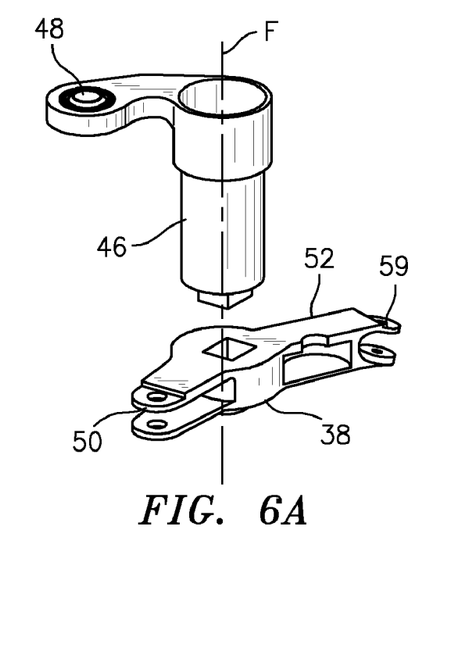
FIGS. 6A and 6B are perspective views of a drive crank and input crank assembly of a dwell system of the rotational flow balance system.
Figure 6B:
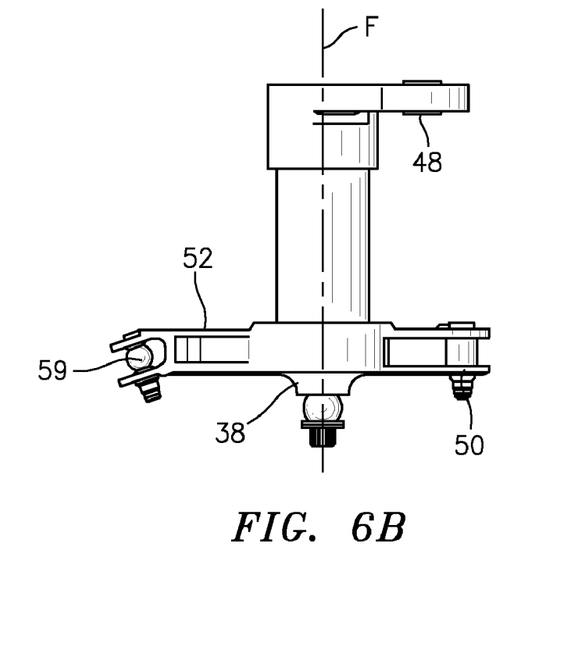

The input crank 46 is mounted to the drive crank 38 (FIG. 6) in a rotationally fixed engagement such that the actuator system 34 rotates the input crank 46 at clevis joint 48 and the drive crank 38 about the drive crank axis F. The drive crank 38 includes a crank pin 50 and a drive arm 52 which are offset from the drive crank axis F. The drive crank 38 engages the MEC crank 40 via the MEC crank pin 50 in the slot feature of the MEC crank 40 to pivot the MEC crank 40 about the MEC crank axis M. It should be understood that various actuator movements as well as control systems may be utilized herewith. The drive arm 52 engages the fan duct blocker drive linkage 44 at joint 59 such that pivotal motion of the drive crank 38 articulates the fan duct blocker ring 30 between a blocked position and an open position. It should be understood that various linkages may be utilized to rotate the fan duct blocker ring 30 between a blocked position and an open position.

Figure 7:
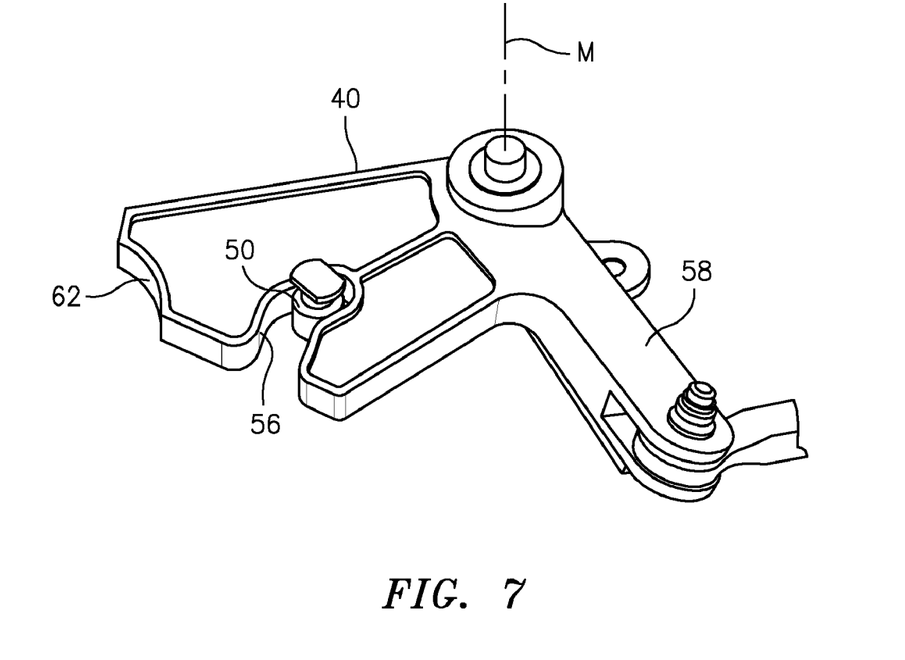
FIG. 7 is a perspective view of a drive crank of a pin in slot system of the rotational flow balance system.
Figure 8:
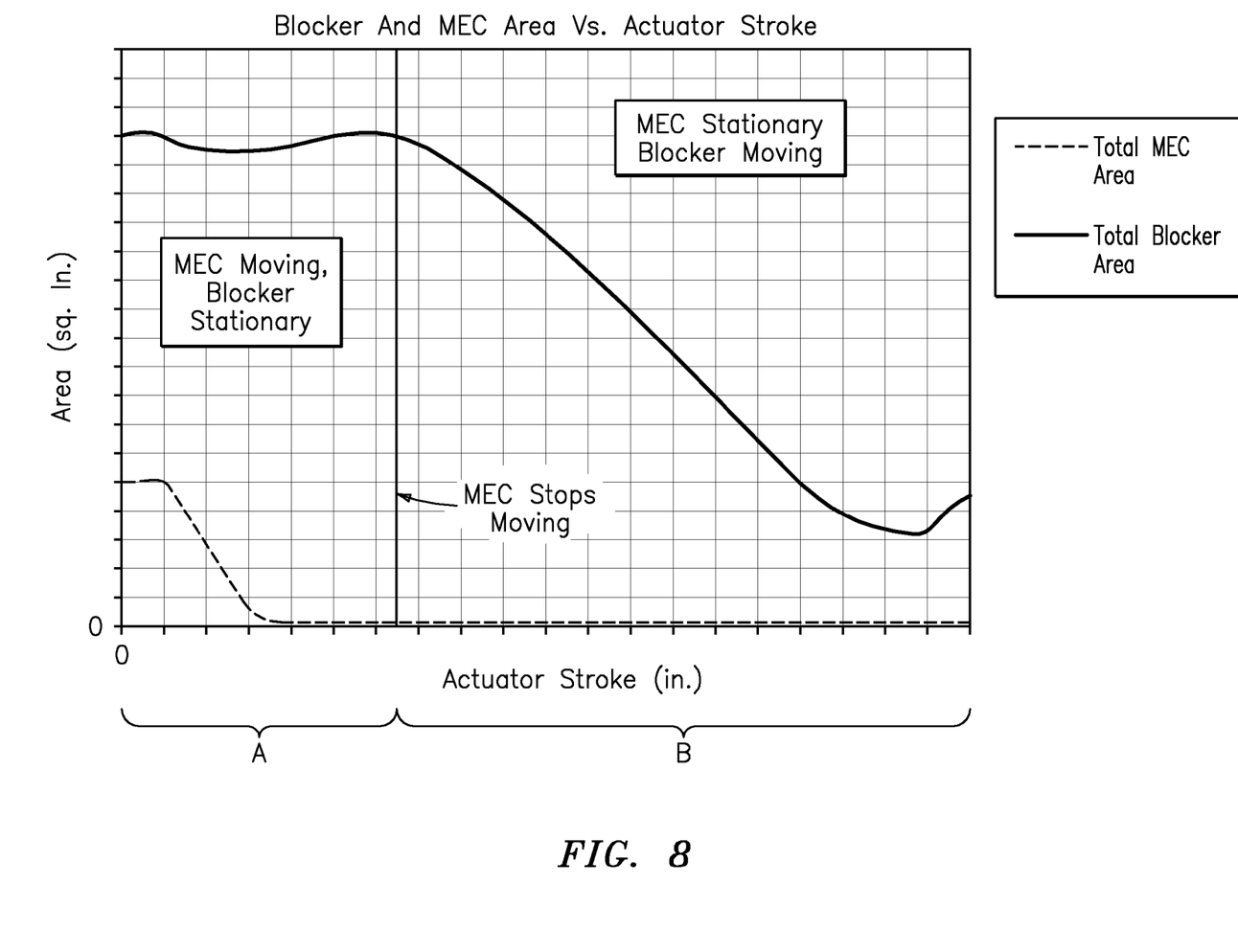
FIG. 8 is a graphical representation of flow area relative actuator stroke for a fan duct blocker ring and a MEC ring driven by a kinematic system according to the present invention.

The MEC crank 40 includes a slot 56 and a drive arm 58 offset from the MEC crank axis M (FIGS. 4 and 7). The drive arm 58 engages the MEC drive linkage 42 such that pivotal motion of the MEC crank 40 articulates the MEC ring 32 between a blocked position and an open position. The MEC drive linkage 42 moves the MEC ring 32 to an open position. It should be understood that other biases may alternatively be applied, however, the disclosed embodiment is failsafe biased to a landing/hover position.

The MEC crank slot 56 receives the crank pin 50 of the drive crank 38. See FIGS. 4 and 5. Rotational motion of the drive crank 38 operates to engage and disengage the crank pin 50 with the MEC crank slot 56 to rotate the MEC crank 40 about the MEC crank axis M. That is, as the crank pin 50 is moved out of the MEC crank slot 56, the MEC ring 32 biases to a closed position. Conversely, as the crank pin 50 is moved into the MEC crank slot 56, the MEC crank 40 is cammed about the MEC crank axis M such that the drive arm 58 drives the MEC drive linkage 42 and rotates the MEC ring 32 toward the open position. When the MEC crank pin 50 disengages from the MEC crank slot 56 the MEC crank 40 will be locked when surface 56 of the MEC crank 40 has rotated to match conforming surface on the drive crank 38. See FIG. 5 which shows the mechanism at 5 positions from when the MEC crank pin 50 is fully engaged in the MEC slot 56 to where it is locked when surface 62 of the MEC crank 40 has rotated to conform to the drive crank 38 matching surface. When surface 62 of the MEC crank 40 conforms to a corresponding surface on the drive crank 38 the MEC crank 40 and MEC ring 32 will the be locked in position. FIG. 6 area A shows that the MEC crank 40 rotates thru approximately 30% of actuator 34 travel (1.3" of 4" actuator stroke), and then stops and disengages from drive crank 38. It should be understood that various linkages may be utilized to rotate the MEC ring 32 between the blocked position and the open position.

Refer to FIGS. 3, 4 and 6. In operation, with both the MEC ring 32 and the fan duct blocker ring 30 initially in a fully open position the actuator system 34 rotates the input crank 46 which rotates the drive crank 38 about the drive crank axis F. Rotation of the drive crank 38 about the drive crank axis F moves the drive crank arm 52 to drive the fan duct blocker drive linkage 44 and articulate the fan duct blocker ring 30 toward the blocked position. The relationship between the drive crank arm 52 of the drive crank 38 and the fan duct blocker drive linkage 44 is such that the common joint 59 between them is initially in the over center position. Initial motion of the drive crank 38 drives the fan duct blocker drive linkage 44 joint 59 to the on center position. Further motion of the drive crank 38 drives the fan duct blocker drive linkage 44 joint 59 under center. During this initial movement the fan duct blocker ring 30 moves a very small amount due to dwelling of the drive crank 38 and the fan duct blocker drive linkage 44 about the on center position at joint 59. This dwelling of the drive crank 38 and the fan duct blocker drive linkage 44 about the on center position at joint 59 ensures that the fan duct blocker ring 30 moves only a minimal amount for the initial approximately 30% of actuator 34 travel (1.3" of 4" actuator stroke). The remaining 70% of actuator 34 travel causes the blocker ring to move to its final closed position.

As the actuator system 34 rotates the input crank 46 and the drive crank 38 about the drive crank axis F, the MEC crank slot 56 is positioned such that the crank pin 50 will move out of the MEC crank slot 56 as the MEC crank 40 rotates about the MEC crank axis M. The MEC ring 32 is thereby biased toward the closed position in response to the MEC crank slot 56 reaction to the MEC crank pin 50 such that the MEC ring 32 will rotate toward the blocked position. In conjunction therewith, the fan duct blocker drive linkage 44 directly drives the fan duct blocker ring 30 toward the blocked position once the actuator 34 has extended to the point where the drive crank 38 drive arm 52 and the fan duct blocker drive linkage 44 at joint 59 have moved out of the over center and on center positions and are in the under center position.

The MEC ring 32 continues to close in response to the crank pin 50 being moved out of the MEC crank slot 56 until the MEC ring 32 has obtained a fully closed position (as illustrated in the beginning of area A in FIG. 6). The crank pin 50 is thereafter free of the MEC crank slot 56 such that the MEC ring 32 and MEC crank 40 remain at the blocked position. While the MEC ring 32 and MEC crank 40 remain at the closed position rotation of the drive crank 38 about the drive crank axis F permits the fan duct blocker drive linkage 44 to articulate the fan duct blocker ring 30 toward the blocked position (as illustrated in the beginning of area B in FIG. 6). Furthermore, rotation of the drive crank 38 about the drive crank axis F permits articulation of the fan duct blocker ring 30 and size of the blocked area as illustrated by in area B in FIG. 6. That is, the fan duct blocker ring 30 can be articulated (within the area B illustrated in FIG. 6) to control the blocked area while the MEC ring 32 remains fixed in the closed position.

To open the MEC ring 32 and the fan duct blocker ring 30, the actuator system 34 rotates the input crank 46 and the drive crank 38 about the drive crank axis F such that the drive arm 52 directly drives the fan duct blocker drive linkage 44 and articulate the fan duct blocker ring 30 toward the open position. The crank pin 50 reengages the MEC crank slot 56 such that the MEC crank 40 is pivoted about the MEC crank axis M and articulates the fan duct blocker ring 30 toward the open position.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotational flow balance system for a gas turbine engine comprising:
   a first rotational flow blocker member, said first rotational flow blocker member biased toward a first position;
   a second rotational flow blocker member;
   a kinematic system linked to said first rotational flow blocker member and said second rotational flow blocker member, said kinematic system operable to rotate said second rotational flow blocker member while said first rotational flow blocker member is biased at said first position said first rotational flow blocker member is a MEC ring.

2. A rotational flow balance system for a gas turbine engine comprising:
   a first rotational flow blocker member, said first rotational flow blocker member biased toward a first position;
   a second rotational flow blocker member;
   a kinematic system linked to said first rotational flow blocker member and said second rotational flow blocker member, said kinematic system operable to rotate said second rotational flow blocker member while said first rotational flow blocker member is biased at said first position, said second rotational flow blocker member is a fan duct blocker ring.

3. A rotational flow balance system for a gas turbine engine comprising:
   a first rotational flow blocker member, said first rotational flow blocker member biased toward a first position:
   a second rotational flow blocker member:
   a kinematic system linked to said first rotational flow blocker member and said second rotational flow blocker member, said kinematic system operable to rotate said second rotational flow blocker member while said first rotational flow blocker member is biased at said first position, said kinematic system includes a drive crank and a pin in slot crank, said drive crank includes a crank pin and a drive arm offset from a drive crank axis, said pin in slot crank includes a crank slot and a drive arm offset from a crank axis, said drive crank axis offset from said crank axis and said crank pin engageable with said crank slot to pivot said crank about said crank axis.

4. The system as recited in claim 3, wherein said drive arm offset from said drive crank axis is linked to said second rotational flow blocker member.

5. The system as recited in claim 4, further comprising an input arm mounted to said drive arm.

6. The system as recited in claim 5, further comprising an actuator which drives said input arm.

7. The system as recited in claim 3, wherein said pin in slot crank is pivotable about said pin in slot crank axis in response to said bias of said first rotational flow blocker member.

8. The system as recited in claim 3, wherein said drive arm offset from said pin in slot crank axis is linked to said first rotational flow blocker member.

9. A rotational flow balance system for a gas turbine engine comprising:
   an actuator;
   a first rotational flow blocker member, said first rotational flow blocker member biased toward a first position;
   a second rotational flow blocker member;
   a drive crank having a crank pin and a drive arm offset from a drive crank axis, said drive arm linked to said second rotational flow blocker member; and
   a pin in slot crank having a pin in slot crank slot and a pin in slot crank drive arm offset from a crank axis, said drive crank axis offset from said crank axis, said crank drive arm linked to said second rotational flow blocker member,
   said actuator operable to pivot said pin in slot crank about said crank axis and said drive crank about said drive crank axis while said crank pin is engaged with said crank slot to articulate said first rotational flow blocker member and second rotational flow blocker member,
   said actuator operable to pivot said drive crank while said crank pin is disengaged from said pin in slot crank slot to articulate said second rotational flow blocker member while said first rotational flow blocker member is biased at said first position.

10. The system as recited in claim 9, wherein said second rotational flow blocker member is located within an annular secondary fan bypass flowpath.

11. The system as recited in claim 9, wherein said first rotational flow blocker member is a MEC ring.

12. The system as recited in claim 9, wherein said second rotational flow blocker member is a fan duct blocker ring.

13. A method of flow control within a gas turbine engine comprising the steps of:
   (A) actuating a first rotational flow blocker member and a second rotational flow blocker member through a drive crank, the first rotational flow blocker member biased toward a first position;
   (B) disengaging a pin in slot crank from the drive crank; and
   (C) articulating the second rotational flow blocker member while said first rotational flow blocker member is biased at the first position in response to said step (B).

14. A method as recited in claim 13, wherein said step (B) further comprises:
   (a) disengaging a crank pin from a pin in slot crank slot.

* * * * *